United States Patent
Kanemitsu et al.

[11] Patent Number: 5,123,695
[45] Date of Patent: Jun. 23, 1992

[54] FRONT BODY STRUCTURE OF A VEHICLE AND METHOD OF ASSEMBLY

[75] Inventors: Norihiko Kanemitsu; Kazuhiro Hara; Noboru Yoshii; Youji Kanba, all of Hiroshima, Japan

[73] Assignee: Mazda Motor Corporation, Japan

[21] Appl. No.: 629,789

[22] Filed: Dec. 19, 1990

[30] Foreign Application Priority Data

Dec. 21, 1989 [JP] Japan .................. 1-333139
Nov. 6, 1990 [JP] Japan .................. 2-301892

[51] Int. Cl.⁵ .............................. B62D 25/08
[52] U.S. Cl. ........................ 296/194; 296/203; 293/155; 180/68.4
[58] Field of Search ............ 296/194, 203, 204; 180/68.4; 293/121, 154, 155

[56] References Cited

U.S. PATENT DOCUMENTS

| | | | |
|---|---|---|---|
| 1,874,400 | 8/1932 | White | 180/68.4 |
| 2,715,448 | 8/1955 | Zeeb | 296/194 X |
| 4,542,934 | 9/1985 | Komatsu et al. | 296/194 |
| 4,597,461 | 7/1986 | Köchy et al. | 296/194 X |

FOREIGN PATENT DOCUMENTS

| | | | |
|---|---|---|---|
| 178266 | 4/1986 | European Pat. Off. | 180/68.4 |
| 274993 | 7/1988 | European Pat. Off. | 296/194 |
| 103773 | 5/1988 | Japan . | |
| 110075 | 5/1988 | Japan . | |
| 103771 | 9/1988 | Japan . | |

Primary Examiner—Margaret A. Focarino
Assistant Examiner—Andrew C. Pike
Attorney, Agent, or Firm—Thompson, Hine and Flory

[57] ABSTRACT

A front body structure of a vehicle and a method of assembling the front vehicle body in which a nose unit having at least both a heavyweight member such as a radiator, etc. and a unit base including shroud members is mounted to a vehicle front body having front side frames forming a closed sectional construction on both right and left sides. A cross member extending in the widthwise direction of the vehicle body is provided between the right and left front side frames of the vehicle body and a support member for supporting the heavyweight member is provided on the nose unit side. The support member is supported by a cross member wherein the nose unit is mounted on the vehicle body.

4 Claims, 10 Drawing Sheets

FRONT BODY STRUCTURE OF A VEHICLE AND METHOD OF ASSEMBLY

BACKGROUND OF THE INVENTION

This invention relates to a front body structure of a vehicle, which includes at least both a heavyweight member such as a radiator and a unit base having shroud members, and method of assembly.

In the conventional art of the vehicle assembling line, each component to be fitted to a front part of a vehicle body such as a bumper, radiator grille, headlamps, radiator, etc. is fitted at a separate station. Accordingly, the number of stations is increased and the line becomes longer and more complicated. There is also an operational problem since the operator on a mixed flow line, in which various types of vehicles are assembled, needs to make a decision whether each component should be fitted to the vehicle body depending on the vehicle type.

By incorporating several components into one unit, easing the operation on the assembly line and reducing the number of stations can be planned. Better precision for fitting components to the unit can also be improved since the whole unit is assembled in a separate line.

Considering the above aspects, Japanese Patent Application Laying Open Gazette No. 63-103771 proposes to incorporate components such as a radiator, headlamps, bumper, radiator grille, etc. to one unit by fitting them to a radiator core support and mounting this unit to a front part of a vehicle body.

However, in such a structure, the right and left side wall parts of the vehicle body having a closed sectional construction and extending longitudinally of the vehicle body are cantilever bridges, such that the front portion (front end portions) of the right and left side walls are free. Consequently, since the front part of the vehicle body has low rigidity and is easy to deform, determining the position of the nose unit to the front part of the vehicle body is difficult. Also, it is necessary to maintain rigidity of the heavyweight member such as a radiator, condenser, etc.

SUMMARY OF THE INVENTION

The object of the present invention is to provide a front body structure of a vehicle in which a nose unit is precisely mounted to a front part thereof without reducing the supporting rigidity of a weight member, and method of assembly. In order to achieve the above object, the vehicle body of the present invention comprises a cross member extending in the widthwise direction of a vehicle body and a heavyweight member supported by a support member on the nose unit side, the support member being supported by the cross member under a condition such that the nose unit is mounted to the front part of a vehicle body.

It is presupposed that a nose unit, having at least both a heavyweight member, such as a radiator, and a unit base including shroud members, is mounted to a front part of a vehicle body having right and left front side frames forming a closed cross sectional construction. While a cross member extending in the widthwise direction of the vehicle body is disposed between front side frames on right and left sides of the vehicle body, a support member for supporting the heavyweight member is provided on the nose unit side, and the support member is supported by the cross member wherein the nose unit is mounted to the vehicle body.

Consequently, since rigidity of the front part of the vehicle body is improved by the cross member and this results in less deformation, the nose unit can be mounted to the vehicle body with better positioning precision. Furthermore, the supporting rigidity of the radiator mounted to the vehicle body is secured since the support member for supporting the heavyweight member such as a radiator, etc. on the nose unit side is supported by the cross member.

In this invention, the vehicle body comprises front fenders and wheel apron reinforcements and the unit base comprises an upper shroud member extending in the widthwise direction of the vehicle body. Each end of the upper shroud member is connected to a front fender and a wheel apron reinforcement of the vehicle body so as to provide mounting strength of the nose unit to the vehicle body.

The unit base, in this invention, further comprises a pair of shroud members hanging down from the upper shroud member, and a support member, extending in the widthwise direction of the vehicle body between the lower end portions of the vertical member. In this case, for example, the support member having an approximately L-shaped section comprises an upper wall part for supporting lower parts of the radiator and the condenser and a vertical wall part extending downwardly from the front end of the upper wall part. In order to increase the supporting rigidity, the upper wall part and the vertical wall part of the support member are bolted to the cross member by bolts and the upper part of the heavyweight member is supported by the upper shroud member through a bracket.

The support member can be one member extending in the widthwise direction of the vehicle body or it can be two members wherein the first and the second support members are separately connected to the lower end portion of the shroud members. In this example, the first and the second support members comprise an upper wall part for supporting the lower part of the radiator which is a heavy member, a vertical wall part extending downwardly from the front end of the upper wall part, and a support member for supporting a coolant condenser, a heavy member, projecting to the front from the lower end of the vertical wall.

Furthermore, in the present invention, each shroud member has a mounting portion for temporarily mounting the bumper in order to incorporate components into a unit.

Furthermore, in the present invention, the assembling method in which the nose unit having both a heavyweight member such as a radiator and a unit base having shroud members is mounted to the front part of the vehicle body having front side frames forming the closed sectional construction of both right and left sides, comprises steps as follows: forming a unit base by providing a support member for supporting the heavyweight member and forming a nose unit by mounting the heavyweight member to the support member, mounting the nose unit to a vehicle body having a cross member between right and left front side frames so that the support member on the nose unit side is supported on the cross member on the vehicle body side, and fixing the support member to the cross member.

By those steps, the rigidity of the front part of the vehicle body is improved by the cross member resulting in less deformation. Consequently, the nose unit can be mounted easily with better positioning precision.

Also, in this invention, the heavyweight member is mounted to the support member wherein the unit base is positioned in a jig for mounting a nose unit after the unit base is formed in order to improve the mounting.

It will be understood that the radiator grille and the lamp unit can be installed on the vehicle body either as a part of the unit or after the support member is fixed to the cross member.

The above objects and other objects, features, and advantages of the present invention will be more apparent from the description of the preferred embodiment in reference to the accompanying drawings.

BRIEF DESCRIPTION OF THE DRAWINGS

The accompanying drawings show a preferred embodiment of the present invention. FIGS. 1-6 show the first embodiment, in which FIG. 1 is a perspective diagram of a front part of a vehicle;

FIG. 2 is a perspective diagram of a front part of a vehicle body;

FIG. 3 is a perspective diagram of a nose unit;

FIG. 4 is an exploded perspective view of a nose unit;

FIG. 5 is a perspective view of a base unit illustrating the mounting of heavyweight members; and FIG. 6 is a sectional view taken on line VI—VI of FIG. 5.

FIGS. 7-13 show the second embodiment, in which

FIG. 7 is a diagram illustrating a relationship of a unit base and a jig for mounting a nose unit;

FIG. 8 is an exploded perspective view of a nose unit;

FIG. 9 is a diagram illustrating mounting of a nose unit to a front part of a vehicle body;

FIG. 10 is a diagram illustrating a front part of a vehicle body after a nose unit is mounted thereon; and FIGS. 11-13 are immediate sectional views taken on lines XI—XI, XII—XII, and XIII—XIII of FIG. 10, respectively.

DESCRIPTION OF THE PREFERRED EMBODIMENT

The preferred embodiments will be described below with reference to the accompanying drawings.

Figure 1:
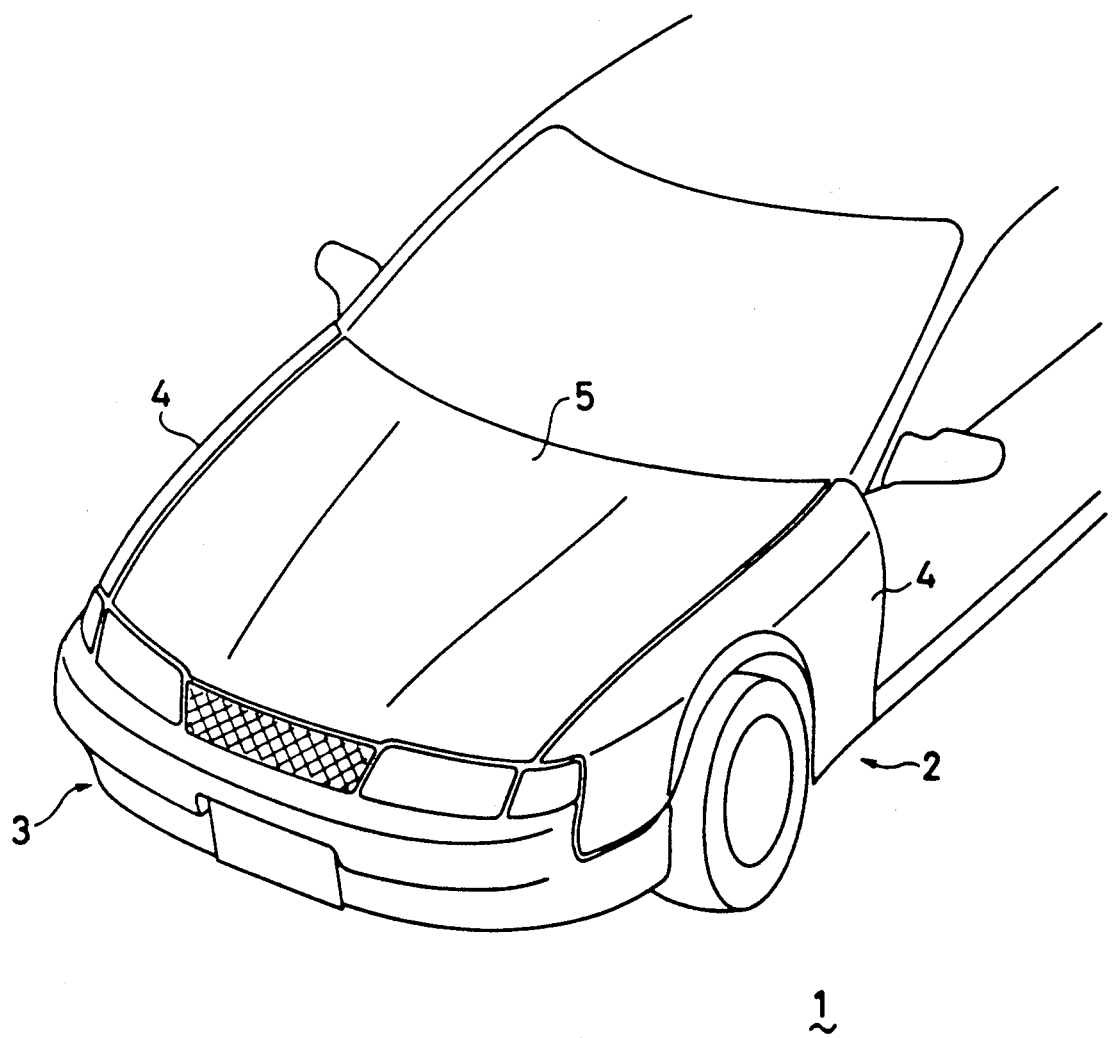

In FIG. 1 illustrating a front part of a vehicle, reference numeral 1 designates a vehicle, and a nose unit 3 is mounted on the front part of the vehicle body 2. Front fenders 4 are provided on the both sides of the body 2, and a bonnet 5 is provided on the front top of the vehicle body 2.

Figure 2:
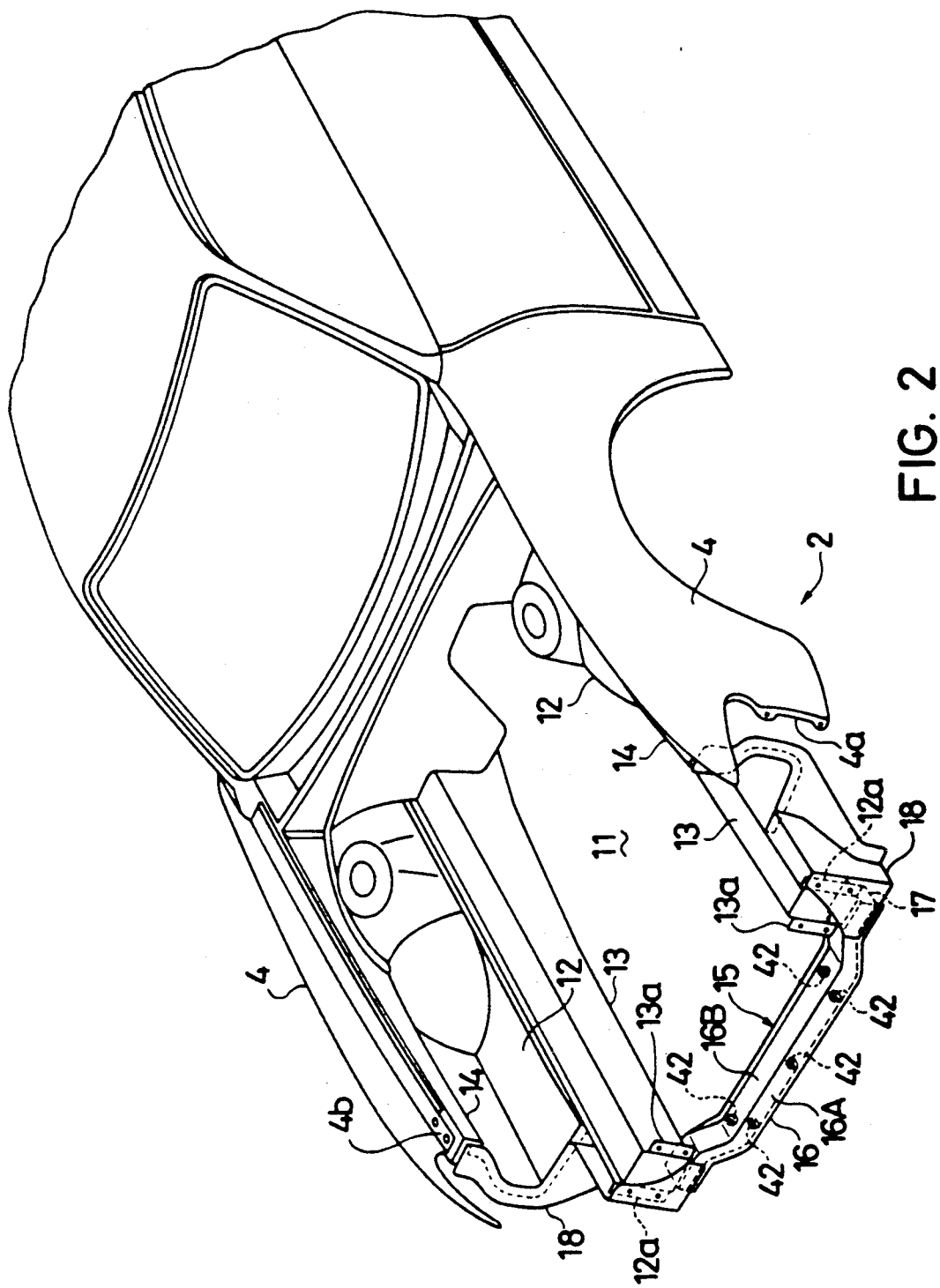

In the vehicle body 2, as shown in detail in FIG. 2, front side frames 13 are connected to lower parts of wheel aprons 12 forming right and left side walls of an engine room 11, and wheel apron reinforcing members 14 are connected to upper parts of the wheel aprons 12 so that both top and bottom closed sectional constructions extending longitudinally of the vehicle body are formed.

A cross member 15 extending in the widthwise direction of the vehicle body is installed between the front side frames 13. In this structure, both right and left ends of the cross member 15 are fixed to the under side of the right and left front side frames 13. An upper member 16, comprising a front wall part 16A positioned on the front side and extending vertically and a top wall part 16B extending rearwardly from the upper end of the front wall part 16A, is connected to a lower member 17 on an underside of the upper member 16 so that the above cross member 15 forms a closed sectional construction extending in the widthwise direction of the vehicle body.

Also, front end panels 18 are connected to the front end portion of the wheel aprons 12, wheel apron reinforcing members 14, and the front side frames 13.

Figure 3:
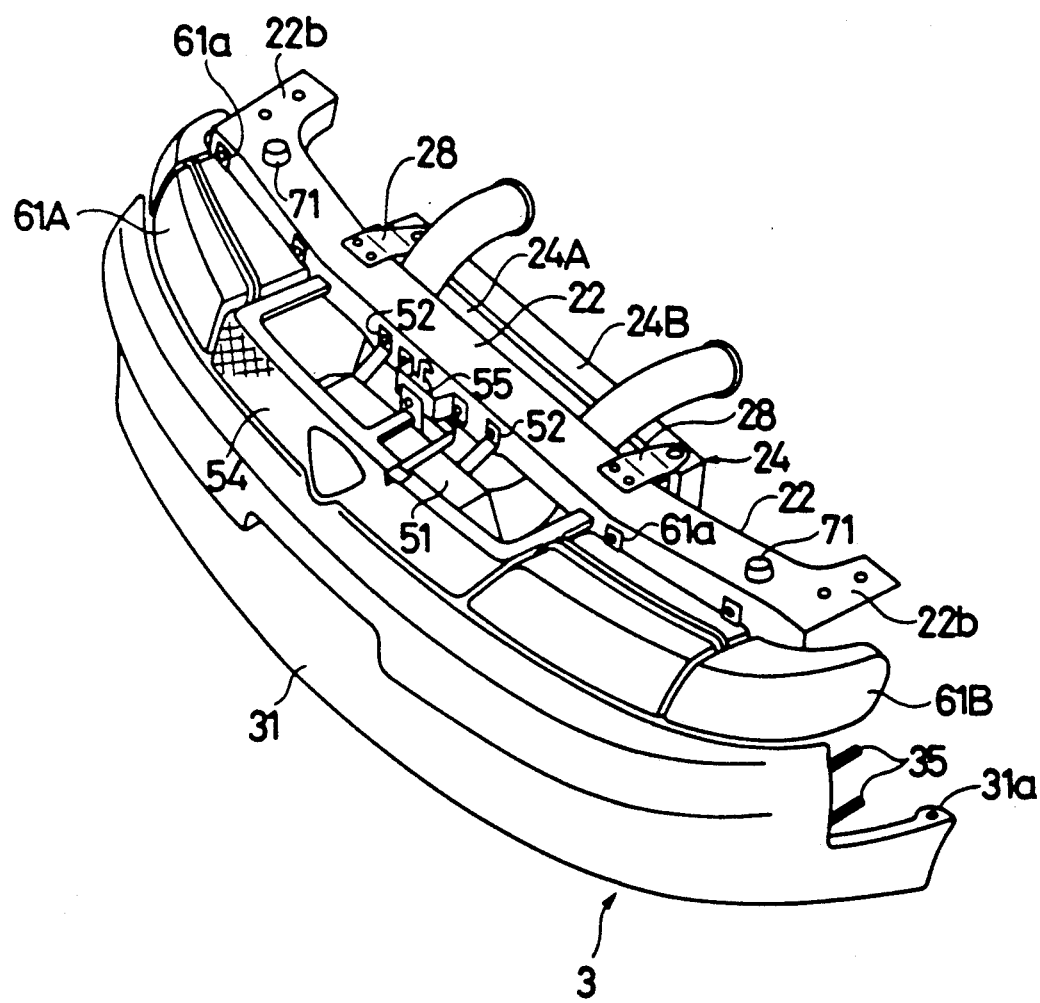
Figure 4:
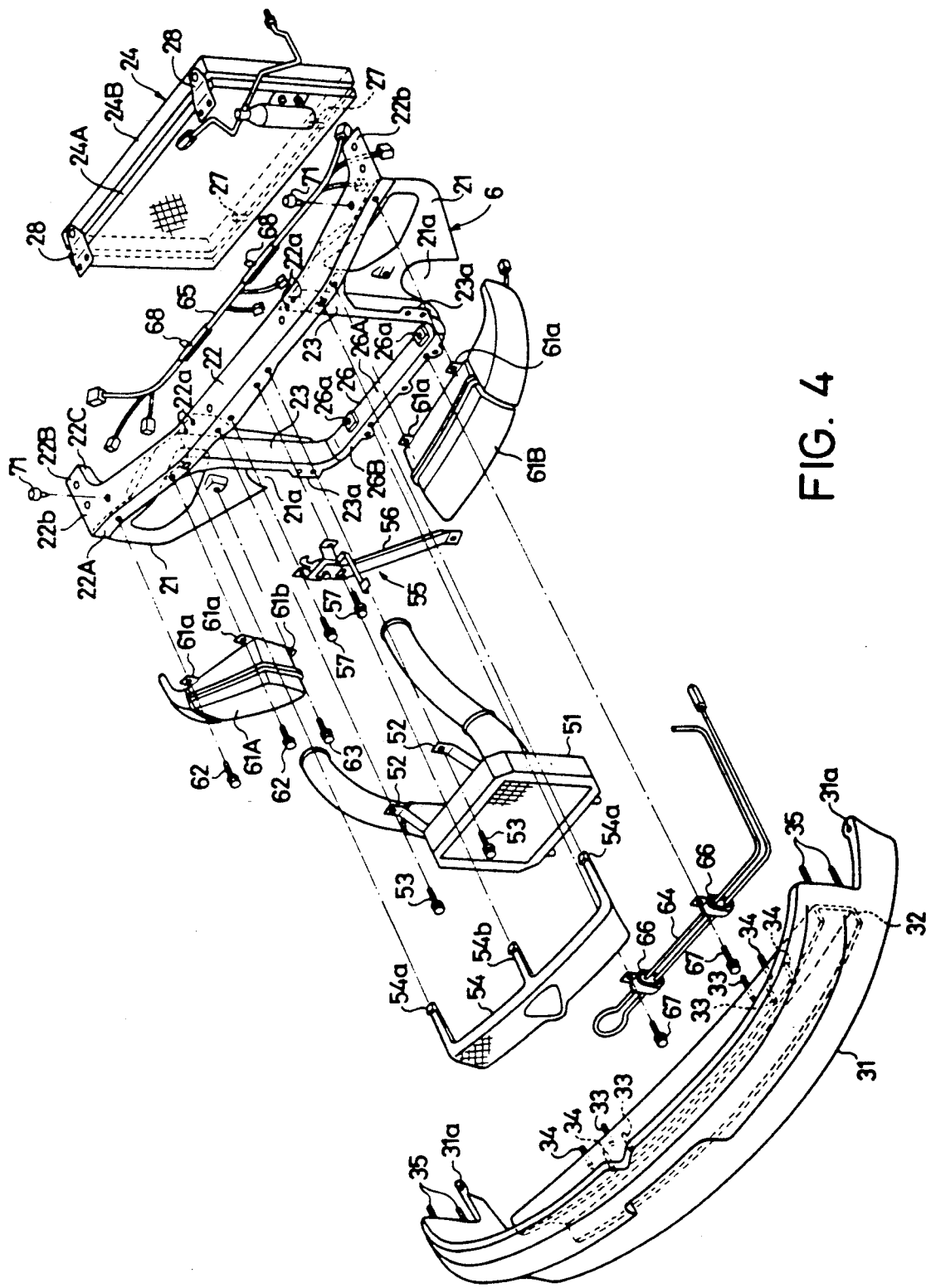

The nose unit 3, as illustrated in detail in FIGS. 3 and 4, is connected to a pair of right and left shroud panels 21 and an upper shroud member 22 extending in the widthwise direction of the vehicle body on the upper end portion of the shroud panels 21. This upper shroud member 22 comprises a vertical wall part 22A extending vertically, an upper wall part 22B extending rearwardly from the upper end of the vertical wall part 22A, and a rear wall part 22C extending downwardly from the rear end of the upper wall part 22B. A pair of shroud members 23 hang down from a center part of an upper shroud member 22 in the widthwise direction of the upper wall part 22B.

At both right and left lower end parts, a support member 26 extending in the widthwise direction of the vehicle body and having approximate L-shaped section is provided. Support member 26 comprises an upper wall part 26A for supporting a condenser 24A and a lower part of a radiator 25B, both of which form weight member 24, and a vertical wall part 26B extending downwardly from the front end of the upper wall part 26A. Condenser 24A and radiator 24B are connected integrally by a member not shown in the drawings. The lower end portion of weight member 24 is supported by mounting portions 26a on the upper wall part 26A of the support member 26 through rubber mount members 27. The upper end portion of weight member 24 is bolted to an upper wall part 22B of the upper shroud 22 by bolts (in FIG. 5, only bolts 29 for one of brackets 28 are shown) through brackets 28 and fitting holes 22a.

Mounting portions 23a are formed at the lower end portion of the shroud members 23, with two bolts 33 from four-in-a-set bolts, which are provided by a bumper reinforcement 32 to which bumper 31 is mounted, are fastened to a front end flange part 13a of the front side of frame 13 through the mounting portions 23a. Two other bolts 34 are fastened to mounting flange part 12a of the wheel apron 12 through the front end panel 18, passing through a lower side cut out part 21a of the shroud panel 21.

Both ends of bumper 31 are also connected to a mounting portion 4a of front fender 4 of vehicle body 2 by bolts 35 provided on the bumper 31 and bolts (not shown in the drawings) passing through a fitting hole 31a of a bumper 31.

Figure 5:
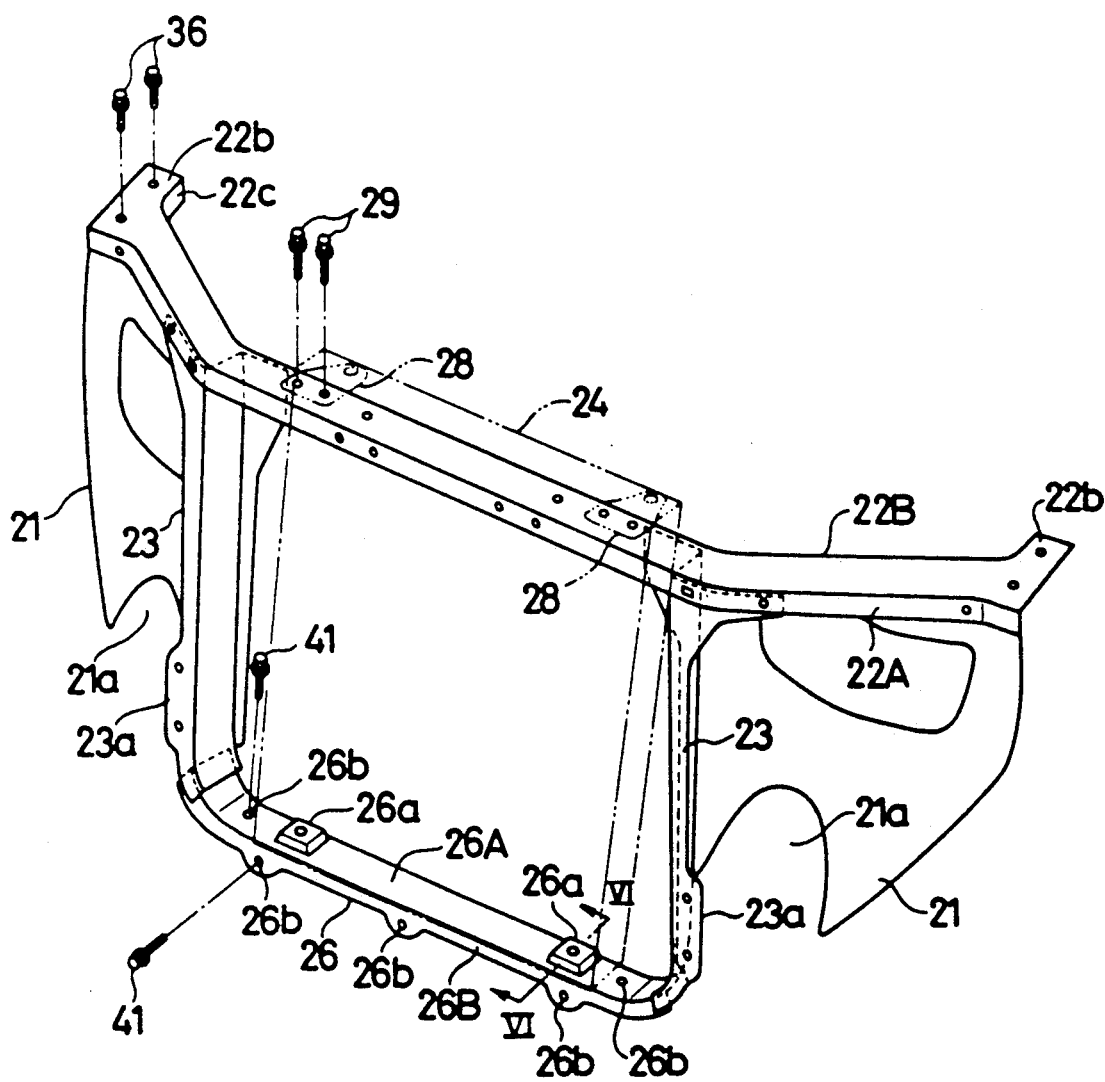

Both ends (mounting portions 22b) of the upper wall parts 22B of the upper shroud 22 are bolted to both a mounting portion 4b of the top of the front fender 4 and a wheel apron reinforcing member 14 by bolts (only two bolts 36 of one mounting portion 22b are shown in FIG. 5).

Thus, the support member 26 is supported on the cross member 15 (upper member 16) wherein the nose unit 3 is mounted to the vehicle body 2 and connected to a front wall part 16A and an upper wall part 16B of the upper member 16 of the cross member 15 by tightening five bolts 41 (only two bolts 41 are shown in FIG. 5) through five fitting holes 26b of upper wall part 26A of the support member 26 and the front wall part 26B onto five nuts 42 which are welded on the upper member 16 corresponding to the fitting holes 26b of the support member 26.

Reference numeral 51 designates an intercooler, an upper part thereof which is bolted to the vertical wall part 22A of the upper shroud 22 by bolts 53 through brackets 52. The lower end portion of the intercooler 51 is supported by brackets projecting from the bumper reinforcement 32; this is not shown in drawings.

Reference numeral 54 designates a radiator grille positioned at a front center part of a vehicle, having both right and left mounting portions 54a fitted into fitting holes of the vertical wall parts 22A of the upper shroud member 22 and a mounting portion 54b at the center fitted into fitting holes of a vertical member 56 of bonnet lock means 55. Bonnet lock means 55 is connected to a vertical wall part 22A of the upper shroud member 22 by tightening bolts 57.

Reference numerals 61A, 61B are right and left lamp units. Mounting portions 61a on the upper end of each unit is bolted to the vertical wall part 22A of the upper shroud 22 by bolts 62, and a mounting portion 61b on the lower end of each unit is connected to the shroud panel 21 by bolts 63 (only bolts 62, 63 and 61b for the lamp unit 61A are illustrated in the drawing). Reference numerals 64, 65 are harnesses for connecting an electric system, the harness 64 is bolted to the support member 26 by bolts 67 into a mounting portion 66 and the harness 65 is fitted into a fitting hole of the upper wall part 22B of the upper shroud member 22 through mounting portions 68. Reference numerals 71 designate shock absorber members for absorbing the shock of opening/closing the bonnet 5 and are connected to an upper wall part 22B of the upper shroud 22.

To assemble a front vehicle body having the above structure, nose unit 3 is built first separate from the vehicle body 2 in which the cross member 15 is interposed between both right and left side frames 13. In other words, unit base 6 having shroud panels 21, upper shroud members 22, a pair of shroud members 23, and support member 26 is formed by providing the support member 26 between the lower end portion of the vertical members 23. First, the lower part of a heavyweight member 24 (the condenser 24A and the radiator 24B) is both supported by and fixed to the support member 26 and the upper end portion of the heavyweight member is supported on the upper shroud member 22 through brackets 28, then the components are mounted so as to construct the nose unit 3.

The thus constructed nose unit 3 is placed on the vehicle body 2 from the front, and fixed in such a fashion that the support member 26 is positioned on upper member 16 of cross member 15. Since the rigidity of the front part of the vehicle body 2 is improved by the cross member 15, better positioning precision can be obtained.

Figure 6:
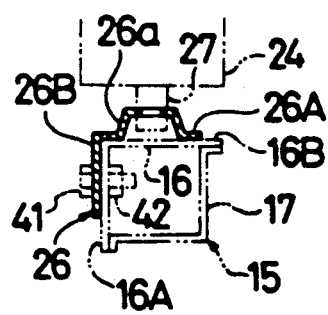

Under this condition, support member 26 is supported on the cross member 15, an implement is inserted through the space between the bumper reinforcement 32 (the bumper 31) and the cross member 15 (the support member 26), and support member 26 is clamped to the cross member 15 by five bolts 41 through nuts 42. In this structure, the support member 26 for supporting the lower part of the heavyweight member 24 which consists of the condenser 24A and the radiator 24B is supported by the cross member 15 and bolted to the front part of a vehicle by bolts 41 and nuts 42 (refer to FIG. 6). This results in achieving rigid support of the condenser 24A and the radiator 24B.

In the above embodiment, the bumper 31 and the bumper reinforcement 32 becomes a part of the nose unit by being temporarily supported by the shroud panels 21 through brackets (not shown in the drawing). However, the bumper, etc. can be excluded from the nose unit and can be mounted later to the front part of a vehicle.

Furthermore, in the above embodiment, the support member for supporting the heavyweight member, such as a radiator, is a single support member 26 extending in the widthwise direction of the vehicle body FIG. 5, however, the support member can be two separate support members separated by a fixed distance in the widthwise direction as illustrated by support members 128 in the following second embodiment (refer to FIGS. 7-13).

Figure 7:
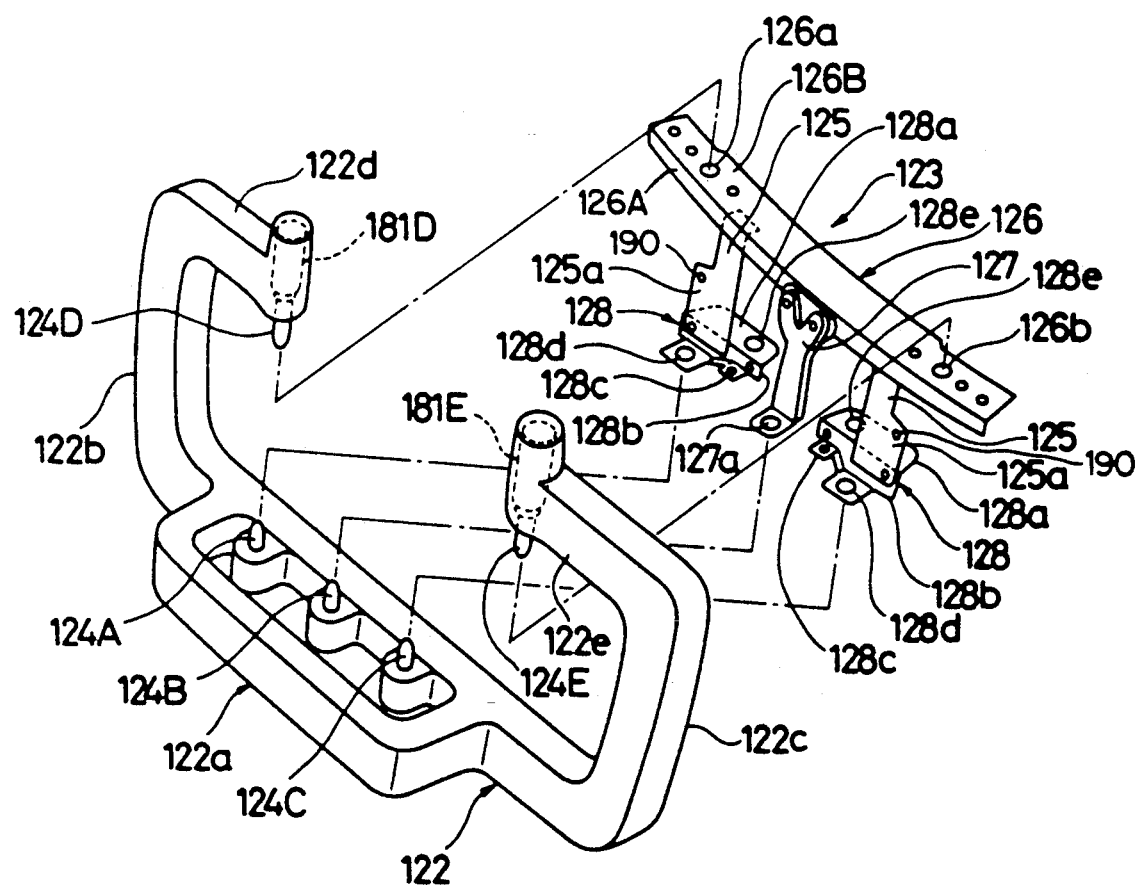
Figure 8:
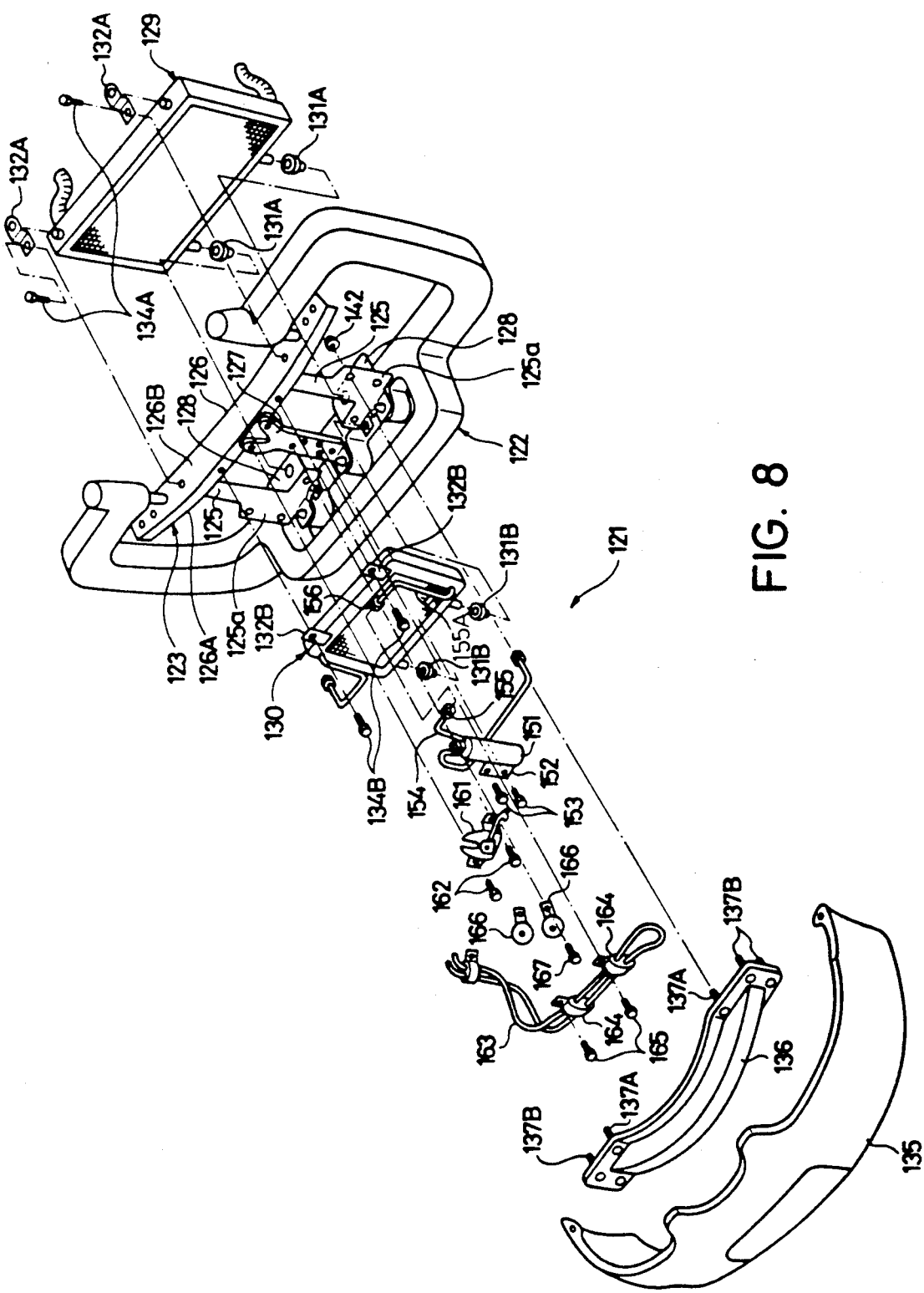

As shown in FIGS. 7 and 8, each component is fitted to a nose unit 121 wherein a unit base 123 is put on a jig 122 for mounting a nose unit.

The jig 122 for mounting the nose unit comprises a base part 122a extending in the widthwise direction of the vehicle body, vertical arm parts 122b and 122c extending upwardly from both ends of the base part 122a, and arm parts 122d and 122e extending to the inboard from the upper ends of the vertical arm parts 122b and 122c. On the base part 122a, three engaging pins 124A, 124B, 124C are provided projecting upwardly, but movable in the vertical direction, and, on the arm parts 122d and 122e, two engaging pins 124D, 124E are provided projecting downwardly, but movable in the vertical direction. The engaging pins 124A-124E move vertically by cylinders (only cylinders 181D, 181E for the engaging pins 124D, 124E are shown in the drawing).

The unit base 123 basically comprises right and left shroud members 125, an upper shroud member 126 extending in the widthwise direction of the vehicle body and fixed to the upper end of shroud members 125, a center piece 127 hanging down from the mid-position of the upper shroud member 126 in the widthwise direction of the vehicle body, and first and second support members 128 each fixed to the lower end portion of each shroud member 125.

Figure 13:
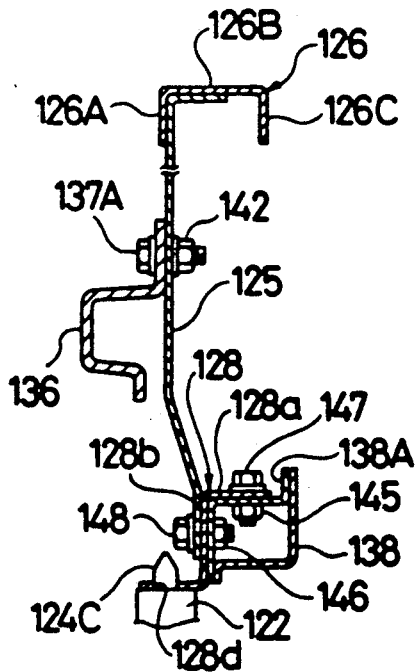

In detail, the upper shroud member 126 comprises a vertical wall part 126A extending vertically, an upper wall part 126B extending rearwardly from the upper end of the vertical wall part 126A, and a rear wall part 126C extending downwardly from the rear end of the upper wall part 126B (refer to FIG. 13). The center piece 127 extending in the vertical direction of the vehicle body is hanging down from the mid-portion of the vertical wall part 126A in the widthwise direction of the vehicle body.

Each support member 128 comprises an upper wall part 128a for supporting a lower part of a radiator 129 which is a weight member, a vertical wall part 128b extending downwardly from the front end of the upper wall part 128a and is connected to the shroud member 125, and a support part 128c for supporting a cooler condenser 130 which is a heavyweight member and projects to the front from the lower end of the vertical wall part 128b.

On both ends of the upper shroud member 126 (the upper wall part 126B) of the unit base 123, on the lower end of the center piece 127, and on the front end of the support members 128, an engaging part comprising fitting holes 126a, 126b, 127a, 128d and 128d for detachable connection with the engaging pins 124D, 124E, 124B, 124A, and 124C are formed. The position of the nose unit 121 is determined by the relationship between the engaging pins 124D, 124E, 124B, 124A, and 124C and the fitting holes 126a, 126b, 127a, 128d and 128d.

Figure 11:
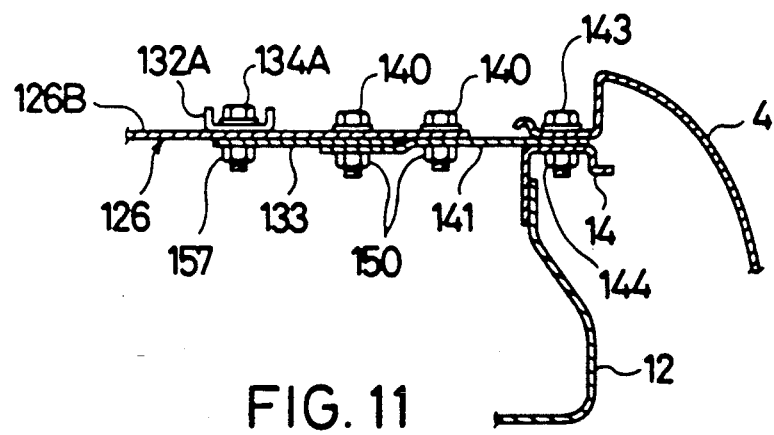
Figure 12:
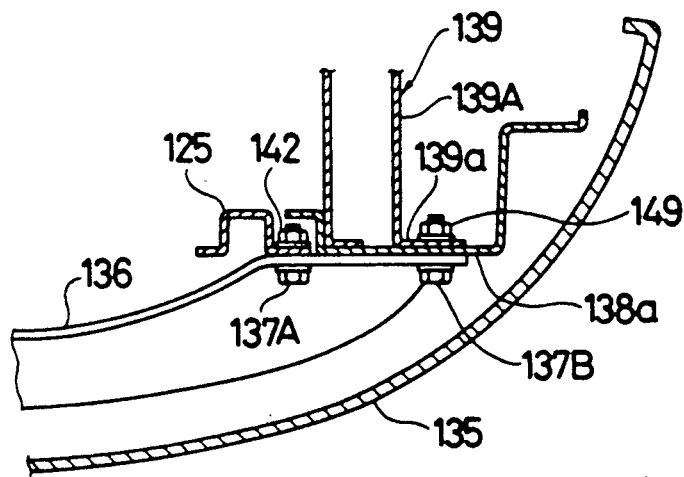

A lower end portion of a radiator 129 and the coolant condensor 130 is supported by upper wall parts 128a of the support members 128 (fitting holes 128e) and support parts 128c (fitting holes) through rubber mounts 131A and 131B. The upper end portion of the radiator 129 and the coolant condenser 130 are bolted to the upper wall part 126B of the upper shroud member 126 reinforced by a radiator reinforcement 133 (refer to FIG. 11) and a vertical wall part 126A by bolts 134A and 134B through brackets 132A and 132B respectively. In FIG. 11, reference numeral 157 designates a nut screwed on the bolt 134A which is already welded on the under side of an upper wall part 126B of the upper shroud member 126 through the radiator reinforcement 133.

Mounting portions 125a consisting of mounting holes 190 are formed at the lower end portion of the shroud members 125 so that two inner bolts 137A out of four-in-a-set bolts, disposed on the bumper reinforcement 136 to which a bumper face 135 is mounted, are fixed in mounting holes 190 in the mounting portions 125a as a temporary mounting for forming a unit by using a nut 142. The two outer bolts 137B are fixed to a front flange part 139a of an outer frame 139A of a front frame 139 through side part 138a of a cross member 138 when mounting a nose unit 121 to a front part of a vehicle so that the bumper reinforcement 136 is connected to the vehicle body 2 directly (refer to FIG. 12).

Both ends of the upper wall part 126B of the upper shroud member 126 are bolted to a shroud bracket 141 by bolts 140. As shown in FIG. 11, a base part of this shroud bracket 141 is clamped between the wheel apron reinforcement 14 and the front fender 4 by a bolt 143 and a nut 144.

Accordingly, the support member 128 is supported on the cross member 138 wherein the nose unit 121 is installed in the front part of the vehicle body 2 and fixed to a front wall part and an upper wall part of an upper member 138A of the cross member 138 by bolts 147 and 148 and nuts 145 and 146 through seven fitting holes of an upper wall part 128a and a front wall part 128b of the support member 128 (refer to FIG. 13).

Reference numeral 151 designates a coolant receiver which is clamped to center piece 127 by bolts 153 through bracket 152. A joint metal fitting 155 of hose member 154 from coolant receiver 151 is connected to a joint metal fitting of hose member 155A of coolant condenser 130.

Reference numeral 161 designates bonnet lock means bolted to a vertical wall part 126A of the shroud upper 126 by bolts 162 through center piece 127.

Reference numeral 163 designates a power steering pipe fixed to center piece 127 and one of the shroud members 125 through a mounting implement 164 and bolts 165. Reference numerals 166 designate horn members fixed to the center piece 127 by a bolt 167.

Figure 10:
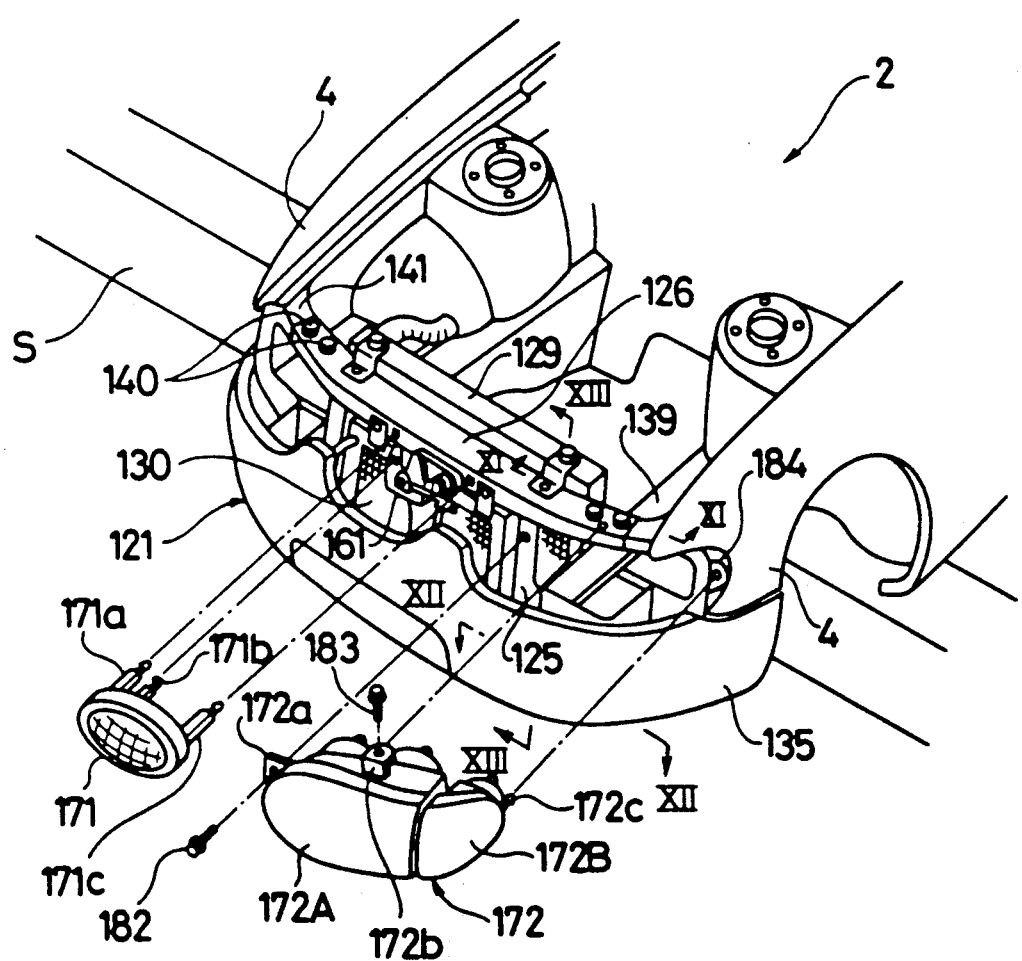

Right and left lamp units 172 comprising head lamp 172A and a front combination lamp 172B, and radiator grille 171, positioned at the front center part of the vehicle, are mounted to the nose unit and the vehicle body after the nose unit 121 is mounted to the vehicle body as shown in FIG. 10. This step differs from the first embodiment. In detail, the radiator grille 171 comprises engaging parts 171a, 171b, and 171c. Right and left side engaging parts 171a and 171c are connected detachably to a vertical wall part 126A (fitting in a fitting hole) of upper shroud member 126, and a center engaging part 171b connected detachably to a vertical wall part 126A (fitting in a fitting hole) of the shroud upper 126 through bonnet lock means 161. In lamp unit 172, mounting portions 172a and 172b on the headlamps 172A side are fixed to a side end portion of the shroud member 125 and an upper wall part 126B (a fitting hole) of the upper shroud member 126 by bolts 182 and 183 respectively, and an engaging portion 172c on the front combination lamp 172B side is fitted in to an engaging portion 184 of the wheel apron.

According to the above structure, each component is mounted to the unit base 123 wherein unit base 123 is supported by the jig 122 for mounting the nose unit and positioned by the relationship between the engaging pins 124A-124E and the fitting holes 126a, 126b 127a, 128d, and 128d (refer to FIG. 8).

Figure 9:
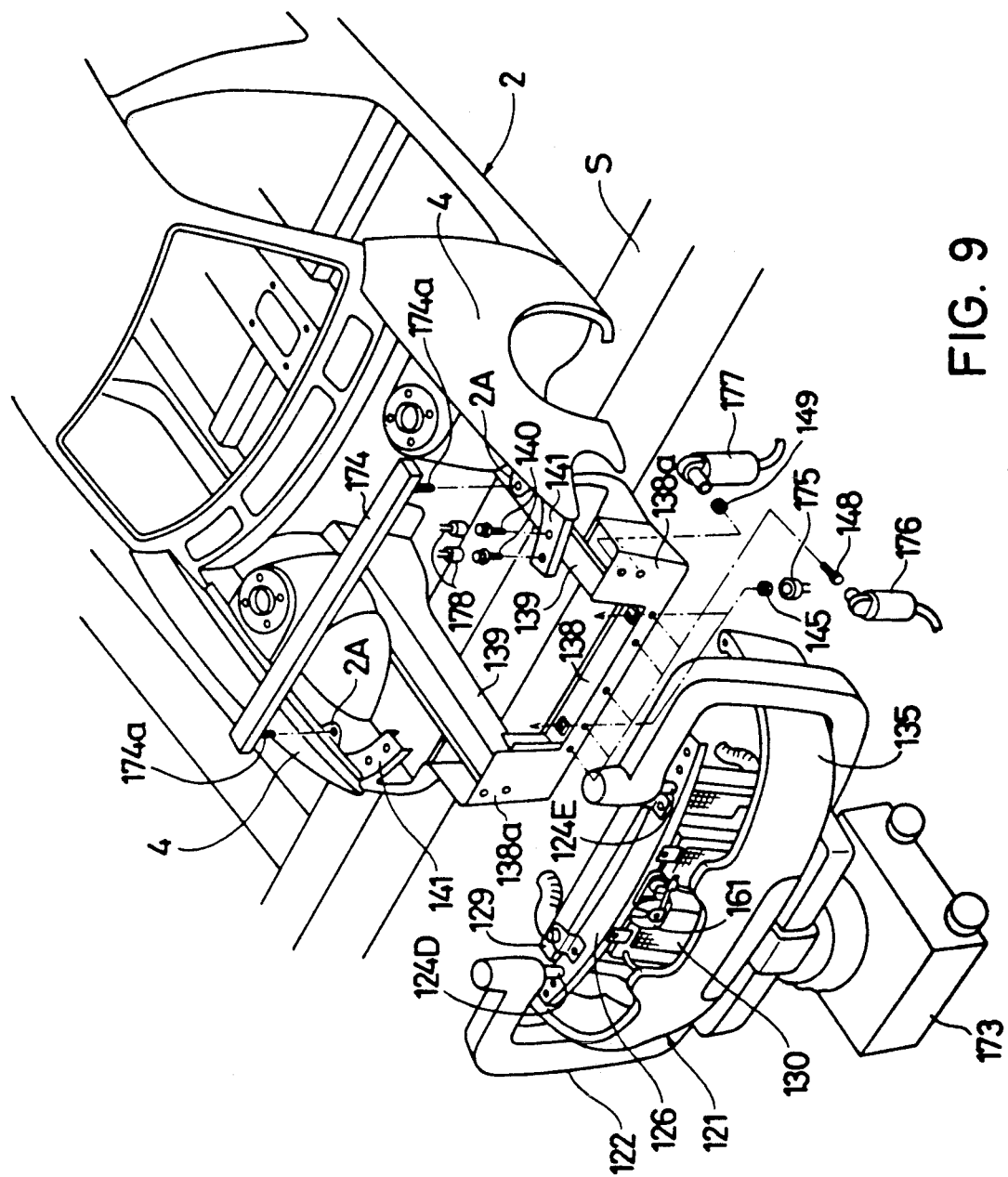

After fitting components to the nose unit, as shown in FIG. 9, the nose unit 121 is put on a truck 173 with the jig 122 and mounted to the front part of the vehicle body 2 while moving on an assembling line S (a main line). Although in this embodiment, a deformation preventing tool 174 for preventing the deformation the of vehicle body 2 can be detachably engaged with engaging portions 2A of both right and left sides of the vehicle body 2 in order to lessen the deformation of the vehicle body 2, (so to speak a front opening), engaging portions 2A and the deformation preventing tool 174 can be excluded since the cross member 138 has the effect of preventing deformation of the front part of a vehicle.

Thus, the center piece 127 and the support members 128 are fixed to the cross member 138 by tightening nut 146 on bolt 148 and tightening bolt 147 on nut 145 using fasteners 175 and 176.

Also, the bumper reinforcement 136 is fixed to a side part 138a of the cross member 138 by tightening nuts 149 on bolts 137B by a fastener 177. Moreover, the upper shroud member 126 is fixed to the shroud bracket 141 by tightening nuts 150 on bolts 140 by a fastener 178.

The radiator grille 171 and the lamp unit 172 are installed after the nose unit 121 is mounted to the front part of the vehicle body 2 (refer to FIG. 10).

Since numerous modifications and variations of the present invention are possible without departing from the spirit or scope of the invention, the above descriptions are not for restricting embodiments but for explaining embodiments. Also, the scope of the present invention is to be considered as being non-limiting, not by any particular details of the disclosed preferred embodiments, or of the drawings, but solely by the scope of the accompanying claims, and, therefore, it is intended to cover all such modifications and variations as fall within the spirit of this invention.

What is claimed is:

1. A front body structure of a vehicle having right and left side frames and right and left wheel apron reinforcing members, said structure comprising a nose unit and a cross member;

said cross member extending widthwise of said vehicle and being mounted on said right and left side frames of said vehicle so as to bridge said side frames and impart rigidity to said vehicle;

said nose unit being fastened as a unit to said cross member, said nose unit including a support means and a radiator, said support means extending widthwise of said vehicle and being fastened to said cross member to assemble said nose unit with said vehicle;

said nose unit further including an upper shroud member extending widthwise of said vehicle and right and left shroud members extending vertically downward from said upper shroud member and spaced from one another on said upper shroud member, each of said right and left shroud members having a horizontally extending support member at a lower end thereof; said radiator being attached directly to said upper shroud member and said support means, and said upper shroud member being fastened to said wheel apron reinforcing members to assemble said nose unit with said vehicle.

2. A front body structure of a vehicle as claimed in claim 1 wherein said support means includes first and second support members spaced from one another widthwise of said vehicle, each of said support members having one of said pair of shroud members extending upwardly therefrom, said shroud members being connected to said upper shroud member.

3. A front body structure of a vehicle as claimed in claim 2 wherein said nose unit further includes a bumper mounted on said shroud members.

4. A front body structure of a vehicle as claimed in claim 2, wherein said first and said second support members each includes:

an upper wall part directly attached to and supporting a lower part of said radiator;

a vertical wall part extending downwardly from a front end of said upper wall part and connected to said right and left shroud members; and a support part projecting frontwardly from a lower end of said vertical wall part and supporting a cooler condenser.

* * * * *